United States Patent Office 3,763,229
Patented Oct. 2, 1973

---

3,763,229
INDAN-1-CARBOXYLIC ACID DERIVATIVES
Shunsaku Noguchi, Shoji Kishimoto, and Mikihiko Obayashi, Osaka, and Isao Minamida and Kiyohisa Kawai, Kyoto, Japan, assignors to Takeda Chemical Industries, Ltd., Osaka, Japan
No Drawing. Filed May 7, 1970, Ser. No. 35,579
Claims priority, application Japan, May 14, 1969, 44/37,199; Dec. 25, 1969, 44/104,576; Dec. 26, 1969, 44/254; Apr. 18, 1970, 45/33,194, 45/33,195
Int. Cl. C07c 61/20, 103/22
U.S. Cl. 260—515 A 3 Claims

ABSTRACT OF THE DISCLOSURE

The present invention provides for compounds of the formula

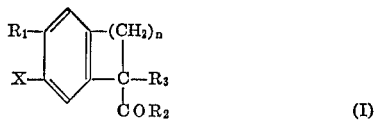

having anti-inflammatory activity, analegetic activity, antipyretic activity and low toxicity, wherein $R_1$ in the formula is alkyl, $R_2$ is hydroxyl, alkoxyl, or amino, $R_3$ is hydrogen or alkyl, X is halogen and $n$ is an integer of 2 or 3. The present application is also concerned with the process of producing the aforementioned compounds. Also provided herein are intermediates used in the production of the compounds of Formula I represented by the general formula

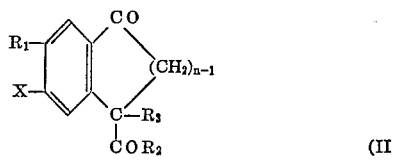

wherein all of the symbols have the same meaning as above.

---

The present invention relates to novel cyclic carboxylic acid derivatives having a strong anti-inflammatory activity and low toxicity and also relates to a process for the production of these derivatives and further relates to a novel intermediate for the cyclic carboxylic acid derivative.

Hithertofore, there have been synthesized many kinds of so-called non-steroidal anti-inflammatory agents, among which phenylbutazone (4-butyl-1,2-diphenyl-pyrazolidine-3,5-dione) has been known as one of the most strong anti-inflammatory agents. Considerable studies are being made to find more effective and less toxic anti-inflammatory agents.

The present invention is the culmination of the studies.

Thus, the principal object of the present invention is to provide novel compounds useful for a non-steroidal anti-inflammatory agent of high anti-inflammatory action. Another object is to provide a method for the production of these novel compounds. Still another object is to provide a novel intermediate for the compounds.

The novel compounds of the present invention are those represented by the general formula

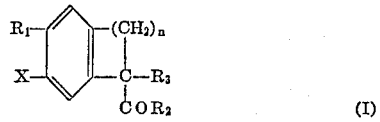

wherein $R_1$ is alkyl, $R_2$ is hydroxyl, alkoxy or amino, $R_3$ is hydrogen or alkyl, X is halogen, and $n$ is an integer of 2 or 3.

The novel intermediates for the cyclic carboxylic acid derivatives (I) are those represented by the general formula

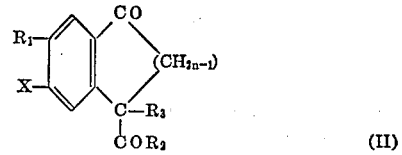

wherein all symbols have the same meaning as above.

The compounds of the general Formula I have higher anti-inflammatory activity than phenylbutazone and show rather low toxicity, and further these compounds have analgetic activity and antipyretic activity.

Therefore, the cyclic carboxylic acid derivative (I) of the present invention can be used as an anti-inflammatory agent safely and more advantageously than phenylbutazone and moveover can be used as analgesic and antipyretic agent.

Referring to the above general formulas, the alkyl represented by $R_1$ is preferably that having 1 to 6 carbon atoms and may be any of straight, branched or cyclic ones. The alkyl includes, for example, methyl, ethyl, propyl, isopropyl, butyl, isobutyl, sec-butyl, tert.-butyl, amyl, hexyl, cyclopropyl, cyclobutyl, cyclopentyl and cyclohexyl, among which cyclohexyl is most desirable. The alkoxy represented by $R_2$ is lower alkoxyl having 1 to 4 carbon atoms, such as methoxy, ethoxy, propoxy and butoxy.

The alkyl represented by $R_3$ is lower ones having 1 to 4 carbon atoms such as methyl, ethyl, propyl, butyl and isobutyl.

The halogen represented by X includes fluorine, chlorine, bromine and iodine.

Typical compounds of the general Formula I are described below:

6-chloro-5-cyclohexylindan-1-carboxylic acid
6-bromo-5-cyclohexylindan-1-carboxylic acid
7-chloro-6-cyclohexyl Tetralin-1-carboxylic acid
6-chloro-5-methylindan-1-carboxylic acid
6-chloro-5-ethylindan-1-carboxylic acid
6-chloro-5-propylindan-1carboxylic acid
6-chloro-5-isopropylindan-1-carboxylic acid
6-chloro-5-n-butylindan-1-carboxylic acid
6-chloro-5-isobutylindan-1-carboxylic acid
6-chloro-5-cyclohexyl-1-methylindan-1-carboxylic acid
6-chloro-5-cyclohexyl-1-ethylindan-1-carboxylic acid
6-chloro-5-cyclohexyl-1-propylindan-1-carboxylic acid
7-chloro-6-cyclohexyl-1-methyl Tetralin-1-carboxylic acid
7-chloro-6-cyclohexyl-1-ethyl Tetralin-1-carboxylic acid, and their pharmaceutically acceptable salts (e.g. sodium, potassium, ammonium, aluminium salts, etc.), lower alkyl esters (e.g. methyl, ethyl, propyl, butyl esters, etc.) and carboxyamides.

The cyclic carboxylic acid derivative (I) of the present invention is produced by the steps which comprises subjecting a phenyl-substituted dicarboxylic acid derivative of the general formula

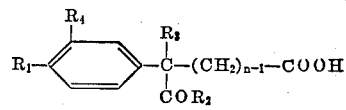

(where $R_1$, $R_2$, $R_3$ and $n$ have, respectively, the same meanings as above and $R_4$ is hydrogen or a halogen represented by X) to intramolecular ring closure reaction, whereby a cyclic ketocarboxylic acid derivative of the general formula

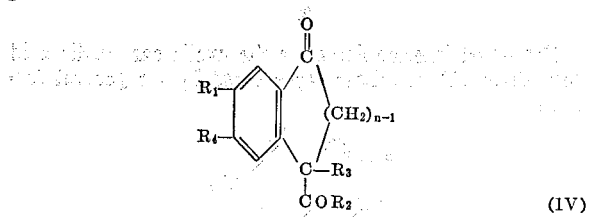

(wherein all the symbols have, respectively, the same meanings as above) is given, and then subjecting the compound (IV) to reduction, whereby a compound of the general formula

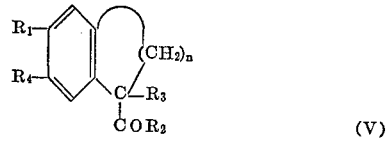

(wherein all symbols have the same meaning as above) is given, and, in a case where the resulting compound (V) is that wherein $R_4$ is hydrogen, this compound is subjected to halogenation, whereby the object compound (I) is produced, and, optionally, in a case where the resulting compound (V) is that wherein $R_3$ is hydrogen, this compound may be subjected to alkylation, whereby the compound (V) wherein $R_3$ is alkyl is given.

The present process mentioned above is summarized in the following scheme:

sulfuric acid, polyphosphoric acid, hydrofluoric acid, etc.) and Lewis acid (e.g. aluminium chloride, boron trifluoride, etc.).

When Lewis acid is used, the amount of the catalyst is not less than 2 moles and preferably up to about 3 moles per mole of the compound (III).

Reaction temperature ranges generally from about $-10°$ C. to about $50°$ C. and preferably from about $0°$ C. to about $10°$ C.

The compound (IV) produced above is then subjected to reduction (Step (2)).

The reduction is conducted according to a conventional reduction technique, by which a carbonyl group is reduced into a methylene group, such as Clemensen's method employing for example amalgamated zinc and hydrochloric acid, and Wolff-Kishner's method wherein a semicarbazone or a hydrazone of the compound (III) is treated with a base.

In a case where the compound (V) wherein $R_4$ is hydrogen is produced by the process as mentioned above, this compound is further subjected to halogenation (Step (3)), whereby the object compound (i.e. (I)–(1) or (I)–(2) in the above scheme) is produced.

The halogenation is accomplished by allowing the compound (V) (wherein $R_4$ is H) to react with a halogenating agent such as halogen (e.g. chlorine, bromine, etc.) and a halogen compound (e.g. sulfuryl chloride, etc.) in the presence of an inert solvent (e.g. carbon tetrachloride, chloroform, ethylene dichloride, methylene chloride, carbon disulfide, acetonitrile, acetic acid, etc.).

The halogenation is generally conducted by the use of,

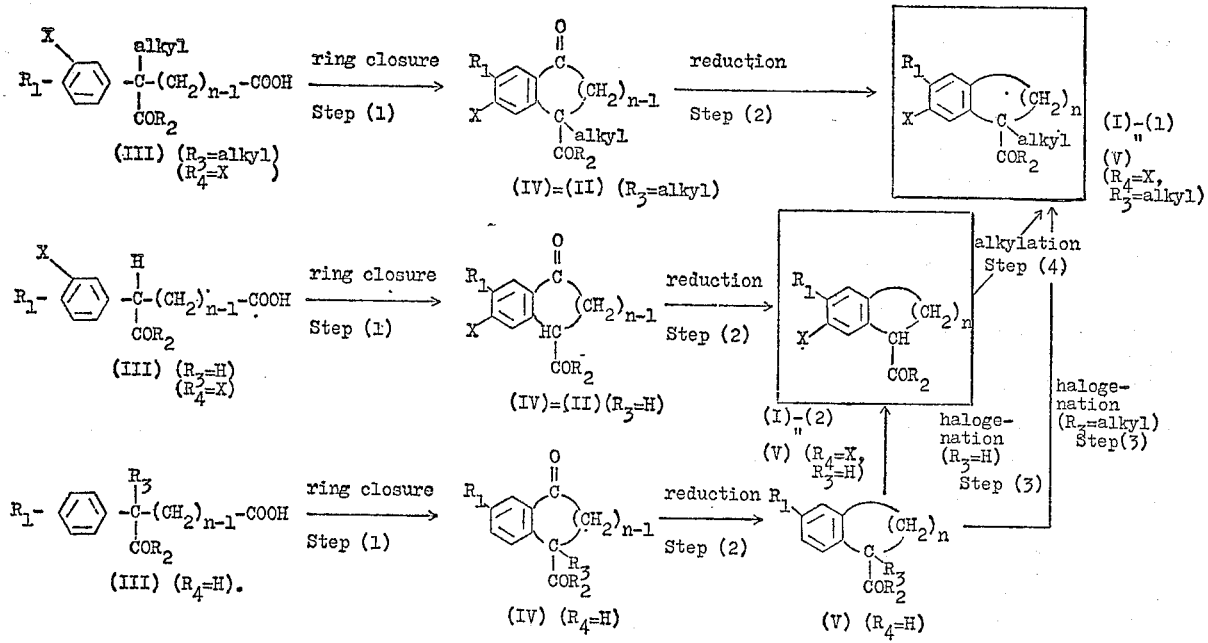

According to the first step (Step (1)) in the present invention, the compound (III) is subjected to an intramolecular ring closure reaction.

The compound (III) may be used as its reactive derivative derived by the conversion of the free COOH group, for instance, acid anhydrides which can be prepared, for example by treating the compound (III) with a dehydrating agent such as acetic anhydride, acetyl chloride or phosphorus oxychloride, or of its acid halides which can be prepared, for example, by treating the compound (III) with a halogenating agent such as thionyl chloride, phosphorus trichloride or phosphorus pentachloride.

The intramolecular ring closure reaction is conducted preferably in the presence of a catalyst with or without the use of a solvent (e.g. methylene chloride, ethylene chloride, etc.). The catalyst employable in the reaction is mentioned by an acidic substance such as an acid (e.g.

as a catalyst, a metallic or non-metallic halogen compound capable of accelerating an ionization of halogen atom. These compounds are exemplified by aluminum chloride, ferric chloride, zinc chloride, antimony trichloride, antimony pentachloride, stannous chloride and other metallic halogen compounds and boron trifluoride and other nonmetallic halogen compounds.

An amount of the halogenating agent to be used generally falls within the range from about 1 to about 3 moles and preferably within the range from about 1 to about 2 moles per mole of the compound (V).

An amount of the catalyst to be used generally falls within the range from about 0.5 to about 3 and preferably within the range from about 1 to about 2 chemical equivalents to the compound (V).

The halogenation temperature is generally about $-70°$ C. to about $50°$ C.

In a case where the compound (V) wherein $R_3$ is hydrogen (i.e.: compound (I)–(2) in the above scheme) is produced by the process mentioned above, this compound may optionally be subjected to alkylation (Step (4)), whereby the compound (V) wherein $R_3$ is alkyl (i.e. compound (I)–(1) in the above scheme) is produced.

The alkylation is conducted by allowing the compound (V) wherein $R_3$ is hydrogen to react with an alkylating agent preferably in the presence of a base and an inert solvent.

The alkylating agent employable includes an alkyl halogenide (e.g. methyl iodide, methyl bromide, methyl chloride, ethyl iodide, ethyl bromide, ethyl chloride, propyl iodide, propyl bromide, propyl chloride, butyl iodide, butyl bromide, butyl chloride, iso-butyl iodide, iso-butyl bromide, iso-butyl chloride, etc.), a dialkyl sulfate (e.g. dimethyl sulfate, diethyl sulfate, etc.), and an ester of an alcohol with a sulfonic acid (e.g. methyl p-toluenesulfonate, ethyl p-toluenesulfonate, etc.).

The base employable in the alkylation includes an alkaline metal (e.g. sodium, potassium, lithium, etc.), an alcoholate (e.g. sodium methoxide, sodium ethoxide, etc.), an alkaline metal hydride (e.g. sodium hydride, lithium hydride, etc.), or alkaline metal amide (e.g. sodium amide, potassium amide, lithium amide, etc.).

The solvent employable included benzene, toluene, dimethyl sulfoxide, dimethyl formamide, hexamethyl phosphoramide, etc.

Temperature for the alkylation generally falls within the range of about $-10°$ C. to about $150°$ C.

By the process mentioned above, the compound (I) of the present invention is produced, which is easily obtained from the reaction mixture after a conventional manner (e.g. evaporation of the solvent, recrystallization, distillation, etc.).

The starting compound (III) (wherein $R_3$ is H) in the present invention is produced for example by allowing a compound of the general formula

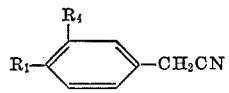

to react with an ester of carbonic acid of a formula $CO(OR_5)_2$ (wherein $R_5$ is alkyl) or an ester of halogeno carbonic acid of the formula $(R_5O)COX''$ (wherein $R_5$ is alkyl and $X''$ is halogen), whereby a compound of the general formula

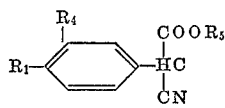

(wherein $R_5$ is alkyl) is produced, then allowing the compound thus produced to react with a compound of the general formula $$X'—(CH_2)_{n-1}—R_6$$

(wherein $R_6$ is an alkoxycarbonyl or nitrile, $X'$ is halogen), or with a compound of the formula $CH_2=CHR_6$ (in a case of $n=3$), whereby a compound of the general formula

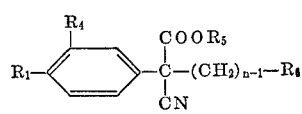

is given, and finally subjecting the compound to hydrolysis and decarbonization to give a compound of the general formula

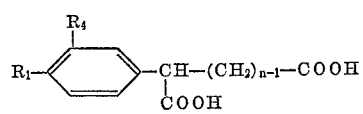
(III)

This compound may be led to its reactive derivatives of —COOH group by a conventional manner.

The starting compound (III) (wherein $R_3$ is alkyl) may be prepared, for example, by allowing a compound of the formula

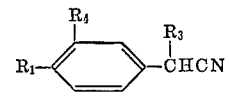

(wherein the symbols have the same meaning as above) to react with a compound of the formula $$X'—(CH_2)_{n-1}—R_6 \text{ or } CH_2=CHR_6$$

(wherein the symbols have the same meaning as above) to give a compound of the formula

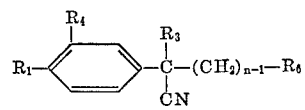

and then subjecting the compound to hydrolysis to give the object compound of the formula

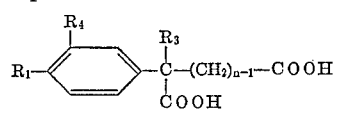

This compound may be led to its reactive derivatives of —COOH group by a conventional manner.

The compound (III) wherein $n$ is 2 can also be prepared by the following steps:

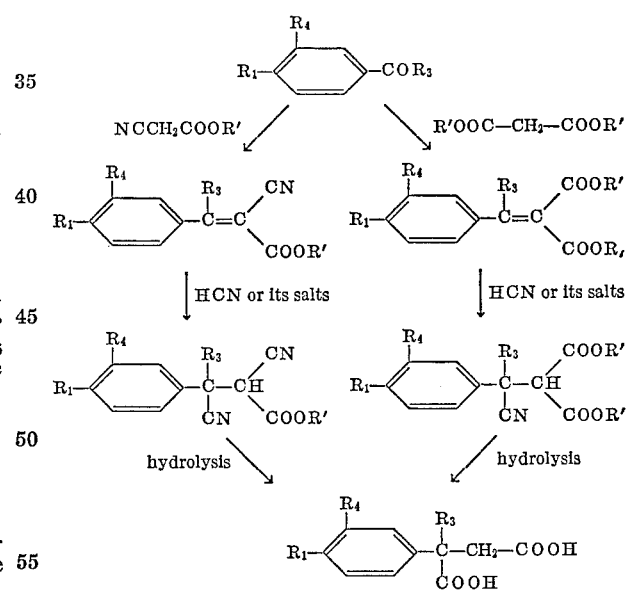

The first starting compound in the above scheme wherein $R_4$ is halogen can be prepared for example by halogenation of a compound of the general formula

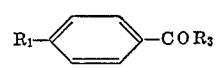

The object compound of the present invention is generally obtained as a racemic mixture, and, if desired, the mixture may be subjected to a conventional optical resolution to obtain each optical isomer.

In the method of the present invention, free carboxylic group may be converted into its reactive derivatives (e.g. acid esters, acid halides, acid amides, acid anhydrides, etc.) or a reactive derivative of a carboxylic group may be converted to any other reactive derivative thereof, by a conventional manner at a suitable stage of the processes, for example, from the ester to the corresponding carboxyamide by treatment with ammonia.

The compound (I) of the present invention is useful for example anti-inflammatory, analgesic, antipyretic or antiruhmatic agent without causing undesirable side effects, and is administered for the purpose in per se or in admixture with a conventional carrier or adjuvant in a suitable medicinal form such as a tablet, granule, powder, capsule or an injection solution. Dose of the compound (I) varies depending on severity of disease, kinds of the compound (I), etc. and generally falls within the range from about 10 to about 2000 milligrams on oral administration and from about 10 to about 1000 milligrams on injection per day for an adult.

For further detailed explanation of the present invention the following examples and references are given, wherein the term "part(s)" means "weight part(s)" unless otherwise specified and the relation between "part" and "part by volume" corresponds to that gram and milliliter.

REFERENCE.—PREPARATION OF THE STARTING MATERIALS (1) An alcoholate solution prepared from 13 parts by volume of ethanol and 0.517 part of metallic sodium is subjected to evaporation under reduced pressure so that most of the ethanol is removed. To the residue is added dropwise a mixture of 10 parts by volume of toluene, 13 parts by volume of diethylcarbonate and 4.3 parts of p-cyclohexylphenylacetonitrile. The mixture is subjected to evaporation to remove the ethanol while adding toluene to the mixture as the ethanol is evaporated off. After cooling, 3.58 parts of ethyl bromoacetate is added to the mixture and refluxed for 1 hour. After cooling, the resultant is poured into ice-water, followed by extraction with ethyl acetate. The ethyl acetate layer is washed with water, dried and subjected to distillation under reduced pressure, whereby 6.0 parts of α-(p-cyclohexyl phenyl)-α-cyanosuccinic acid diethylester is given. The ester is dissolved in 50 parts by volume of ethylene glycol and refluxed under nitrogen atmosphere in the presence of 8 parts of potassium hydroxide for 2 hours. After cooling, the resultant is poured into ice-water and washed with ether. The aqueous layer is taken and acidified with the addition of hydrochloric acid, followed by extraction with ethyl acetate. The ethyl acetate layer is washed with water, dried and concentrated. Recrystallization of the residue from benzene yields p-chlorohexylphenylsuccinic acid melting at 182–185° C.

Elementary analysis.—Calculated (percent): C, 69.56; H, 7.30. Found (percent): C, 69.45; H, 7.30.

(2) To an alcoholate prepared from 13 parts by volume of ethanol and 0.517 part of metallic sodium, is added dropwise a mixture of 10 parts by volume of toluene, 5 parts of p-cyclohexyl-m-chlorophenylacetonitrile and 13 parts by volume of diethyl carbonate. The mixture is treated in a similar manner to that in (1) above. After cooling, 3.58 parts of ethyl bromoacetate is added dropwise to the resultant and refluxed for 1 hour. After cooling, the resultant is poured into ice-water, followed by extraction with ethyl acetate. The ethyl acetate layer is treated in a similar manner to that (1) above, whereby 7.7 parts of α-(p - cyclohexyl-m-chlorophenyl)-α-cyanosuccinic acid diethylester is given. The ester is treated in a similar manner to that in (1) above in the presence of 50 parts by volume of ethylene glycol and 8 parts of potassium hydroxide, whereby p-cyclohexyl-m-chlorophenylsuccinic acid is given as crystals melting at 175–177° C.

Elementary analysis.—Calculated (percent): C, 61.84; H, 6.16. Found (percent): C, 62.13; H, 6.15.

(3) A mixture of 30 parts of p-cyclohexylacetophenone, 19 parts of ethyl cyanoacetate, 2.7 parts of β-alanine, 7.5 parts by volume of acetic acid and 50 parts by volume of benzene is refluxed at 90 to 100° C. for 10 hours. After cooling, 100 parts by volume of benzene is added to the resultant and washed with water. The benzene layer is dried and subjected to evaporation under reduced pressure to remove the solvent. The residue is subjected to vacuum distillation, whereby ethyl 2-cyano-3-(p-cyclohexylphenyl)-2-butenoate is given as an oily product boiling at 180 to 185° C./3 mm. Hg.

Elementary analysis, $C_{19}H_{23}NO_2$.—Calculated (percent): C, 76.73; H, 7.80; N, 4.71. Found (percent): C, 76.96; H, 7.89; N, 4.85.

To a solution of 25 parts of ethyl 2-cyano-3-(p-cyclohexylphenyl)-2-butenoate in 50% ethanol is added 7.7 parts of potassium cyanide and the mixture is heated on a water bath for 30 minutes. After cooling, the mixture is acidified with hydrochloric acid, whereby an oily substance is separated. The oily substance is dissolved in 200 parts by volume of 50% ethanol, and heated with 30 parts of potassium hydroxide. The mixture is heated under reflux for 16 hours. After cooling, the resultant is subjected to evaporation to remove the ethanol under reduced pressure. To the residue is added water and the mixture is acidified with hydrochloric acid under cooling. The separated substance is extracted with ethyl ether. The ether layer is washed with water, dried and subjected to evaporation to remove the ether. The residue is recrystallized from ethanol, whereby 2-methyl-2-(p-cyclohexylphenyl) succinic acid is yielded as colorless crystals melting at 164 to 165° C.

Elementary analysis. $C_{17}H_{22}O_4$.—Calculated (percent): C, 70.32; H, 7.64. Found (percent): C, 70.23; H, 7.67.

In a similar manner to the above reference (1), (2) or (3), the following compounds can be prepared:

m-Chloro-p-isobutylphenylsuccinic acid melting at 99 to 101 C.,
p-Isopropylphenylsuccinic acid melting at 178 to 180° C., and
p-Isobutylphenylsuccinic acid melting at 151.5 to 154° C.

(4) To an alcoholate prepared from 257 parts by volume of ethanol and 10.3 parts of metallic sodium, is added dropwise a mixture of 69 parts by volume of toluene, 84.5 parts of p-cyclohexylphenylacetonitrile and 250 parts of diethyl carbonate. The mixture is heated with stirring to evaporate the ethanol produced through the prosecution of the reaction, while adding toluene to the mixture in proportion to the evaporated ethanol, until the evaporation of the ethanol stops. After cooling, the resultant is acidified with diluted acetic acid, followed by extraction of the aqueous layer with ethyl ether. The ether layer is washed with water, dried and subjected to a distillation under reduced pressure, whereby 97.8 parts of ethyl α-cyano-α-(p-cyclohexyphenyl)acetate is yielded.

Thus yielded ester is dissolved in 98 parts by volume of tert-butanol and the solution is stirred at 40° C.–45° C. while being added alternately 3.5 parts by volume of a saturated methanol solution of potassium hydroxide and a tert-butanol solution of 40.4 parts of acrylonitrile. After addition is over, the mixture is stirred for 1.5 hours, cooled and acidified with the addition of diluted hydrochloric acid. Extraction of the aqueous layer with ethyl ether yields 92.3 parts of α-carboethoxy-α-(p-cyclohexylphenyl)glutaronitrile. Thus yielded ester is dissolved in 100 parts by volume of ethanol and the solution is refluxed in the presence of 100 parts by volume of water and 100 parts of potassium hydroxide for 10 hours. After cooling, water is added to the resultant and washed with ethyl ether. The aqueous layer is acidified with hydrochloric acid and extracted with ethyl ether. The ether layer is washed with water, dried and concentrated. Crystallization of the residue from ethylene chloride yields 2-(p-cyclohexylphenyl)glutaric acid as crystals melting at 95–97.5° C. (contains the solvent of crystallization).

Elementary analysis.—Calculated (percent): C, 70.32; H, 7.64. Found (percent): C, 71.51; H, 8.30.

EXAMPLE 1

Cyclization step

A mixture of 12.5 parts of p-cyclohexylphenylsuccinic acid and 60 parts by volume of acetic anhydride is refluxed for one hour, followed by evaporating off the solvent under reduced pressure. The residue is washed with n-hexane to yield 10.1 parts of crude crystals of p-cyclohexylphenylsuccinic anhydride. Recrystallization from n-hexane yields crystals melting at 114 to 117° C.

Elementary analysis.—Calculated (percent): C, 74.41; H, 7.02. Found (percent): C, 73.25; H, 7.03.

Nine parts of aluminium chloride is added to 75 parts by volume of methylenechloride with stirring under ice cooling. To the mixture is added dropwise 7.8 parts of the crude crystals of p-cyclohexylphenylsuccinic anhydride prepared above in 45 parts by volume of methylenechloride. The whole mixture is stirred under ice-cooling for one hour and then at room temperature for further several hours. The resultant is poured into ice water, followed by addition of hydrochloric acid. The methylenechloride layer is taken, washed with water, dried over magnesium sulfate, decolorized with charcoal and subjected to evaporation of the methylenechloride under reduced pressure. The residue is washed with n-hexane and crystallized from 90 parts by volume of ligroin, whereby 3-oxo-5-cyclohexylindan-1-carboxylic acid is given as colorless crystals melting at 111 to 115° C.

Elementary analysis.—Calculated (percent): C, 74.41; H, 7.02. Found (percent): C, 74.32; H, 6.90.

Reduction step

To zinc amalgam prepared from 10 parts of zinc powder and 1 part of mercuric chloride are added 7.5 parts by volume of water, 10 parts by volume of concentrated hydrochloric acid, 10 parts by volume of toluene and 1 part of 3-oxo-5-cyclohexylindan-1-carboxylic acid prepared above.

The whole mixture is heated under reflux with vigorous stirring, while adding four times at about 3 hours interval each 5 parts by volume of concentrated hydrochloric acid and 1 part of 3-oxo-5-cyclohexylindan-1-carboxylic acid. The stirring continues for 30 hours in total. The resultant is poured into water, followed by extraction with ethyl ether. The ether layer is dried over anhydrous sodium sulfate, decolorized with charcoal and subjected to evaporation under reduced pressure to remove the solvent, whereby 5-cyclohexylindan-1-carboxylic acid is given as colorless crystals melting at 140 to 144° C. Yield 2.6 parts.

Elementary analysis.—Calculated (percent): C, 78.67; H, 8.25. Found (percent): C, 78.50; H, 8.38.

Halogenation step (1) To a mixture of 1.2 parts of 5-cyclohexylindan-1-carboxylic acid, 0.8 part of ferric chloride and 40 parts by volume of carbon tetrachloride is added dropwise with stirring under ice-cooling a solution of 0.4 part of chlorine in carbon tetrachloride. One hour after the addition, ice-water and hydrochloric acid are added to the resultant, followed by extraction with chloroform. The chloroform layer is dried over magnesium sulfate and subjected to evaporation under reduced pressure to remove the solvent. The residue is treated with petroleum ether to yield 0.74 part of crude crystals of 6-chloro-5-cyclohexylindan-1-carboxylic acid. Recrystallization from n-hexane yields crystals melting at 147 to 150° C.

Elementary analysis.—Calculated (percent): C, 68.94; H, 6.87; Cl, 12.72. Found (percent): C, 68.85; H, 7.04; Cl, 12.66.

(2) To a mixture of 2.4 parts of 5-cyclohexylindan-1-carboxylic acid, 1.5 parts of aluminium chloride and 100 parts by volume of dichloromethane is dropwise added with stirring a dichloromethane solution of 0.78 part of chlorine under cooling to −65 to −50° C. with Dry Ice-acetone.

The stirring continues at the same temperature for further 5 hours. A solution of 0.16 part of chlorine in dichloromethane is added to the resultant, and the whole mixture is stirred for 2 hours, followed by keeping standing overnight under the same cooling condition as above. Ice water and hydrochloric acid are added to the resultant, followed by extraction with chloroform. The chloroform layer is dried over magnesium sulfate and subjected to evaporation under reduced pressure to remove the solvent. The residue is treated with petroleum ether to yield 0.8 part of crude crystals of 6-chloro-5-cyclohexylindan-1-carboxylic acid, which is found to be identical with the product obtained in (1) in its melting point and IR-absorption spectrum.

(3) A mixture of 0.6 part of 5-cyclohexylindan-1-carboxylic acid and 8 parts by volume of sulfurylchloride is heated at 80° C. for 2 hours. After cooling, the resultant is poured into ice-water, stirred well and extracted with ethyl ether. The ether layer is washed with an aqueous sodium chloride solution, dried and subjected to evaporation under reduced pressure to remove the solvent. Petroleum ether is added to the residue and the mixture is allowed to stand, whereby 6-chloro-5-cyclohexylindan-1-carboxylic acid is given as colorless crystals, which is found to be identical with the product obtained in (1) in its melting point and IR-absorption spectrum.

(4) To a mixture of 1.2 parts of 5-cyclohexylindan-1-carboxylic acid, 0.8 part of ferric chloride and 40 parts by volume of carbon tetrachloride is added dropwise 0.8 part of bromine with stirring under ice-cooling. Two hours after the addition, ice-water and hydrochloric acid are added to the mixture, followed by extraction with chloroform. The chloroform layer is dried over magnesium sulfate and subjected to evaporation under reduced pressure to remove the solvent. The residue is treated with petroleum ether to yield 0.9 part of crude crystals of 6-bromo-5-cyclohexylindan-1-carboxylic acid. Recrystallization from n-hexane gives crystals melting at 160 to 164° C.

Elementary analysis.—Calculated (percent): C, 59.47; H, 5.93; Br, 24.73. Found (percent): C, 59.55; H, 5.85; Br, 24.52.

(5) To a mixture of 0.6 part of 5-cyclohexylindan-1-carboxylic acid, 0.4 part of ferric chloride and 40 parts by volume of acetonitrile is added dropwise with stirring an acetonitrile solution of 0.2 part of chlorine. The mixture is stirred at the same temperature for 1 hour. After the reaction is complete, water is added to the resultant. The aqueous mixture is shaken well, then the acetonitrile and water are evaporated off under reduced pressure. To the residue are added diluted hydrochloric acid and chloroform and the mixture is shaken well. The lower layer is dried over magnesium sulfate, then the solvent is evaporated off. The residue is shaken well with petroleum ether, whereby 5-cyclohexyl - 6 - chloroindan-1-carboxylic acid is given. The product thus yielded is in well agreement with the product as obtained in the above examples in the melting point and infrared spectrum.

(6) A solution of 0.2 part of chlorine in chloroform is added dropwise with stirring to a mixture of 0.6 part of 5-cyclohexylindan-1-carboxylic acid, 0.4 part of ferric chloride and 20 parts by volume of chloroform which is cooled at a temperature between −10 and −5° C. The mixture is stirred at the same temperature for 1 hour, followed by the addition of diluted hydrochloric acid. After the mixture is shaken well, the separated chloroform layer is dried over sodium sulfate and subjected to evaporation to remove the solvent. The residue is washed with petroleum ether, whereby 5-cyclohexyl-6-chloroindan-1-carboxylic acid is given as colorless crystals. The product thus given is in well agreement with the product obtained in the above examples in the melting point and the infrared absorption spectrum.

(7) A solution of 0.2 part of chlorine in carbon disulfide is added dropwise with stirring to a mixture of 0.6 part of 5-cyclohexylindan-1-carboxylic acid, 0.4 part of ferric chloride and 20 parts by volume of carbon disulfide, which is cooled at a temperature between −10 and −5° C. The mixture is stirred at the same temperature for 1 hour, followed by the addition of diluted hydrochloric acid. The mixture is shaken well and the separated carbon disulfide layer is dried over sodium sulfate and subjected to evaporation to remove the solvent. The residue is washed with petroleum ether, whereby 5-cyclohexyl-6-chloroindan-1-carboxylic acid is given as colorless crystals. The crystals are in well agreement with the product obtained in the above examples in the melting point and the infrared absorption spectrum.

(8) An acetic acid solution of 0.1 part of chlorine is added to a mixture of 0.3 part of 5-cyclohexylindan-1-carboxylic acid and 20 parts by volume of acetic acid at a temperature from 20 to 22° C. The mixture is stirred at the same temperature for 2 hours and subjected to evaporation under reduced pressure to remove the solvent. The residue is washed with petroleum ether, whereby 5-cyclohexyl - 6 - chloroindan - 1 - carboxylic acid is afforded as colorless crystals. The product is in well agreement with the product obtained in the above examples in the melting point and the infrared absorption spectrum.

(9) An acetonitrile solution containing 0.8 part of chlorine is added with stirring under ice-cooling to a mixture of 2.44 parts of 5-cyclohexylindan-1-carboxylic acid and 160 parts by volume of acetonitrile. The mixture is stirred at the same temperature for 1 hour, followed by the addition of an acetonitrile solution of 0.4 part of chlorine. The mixture is stirred at the same temperature for 1 hour and at a temperature from 19 to 24° C. for 4 hours, and subjected to evaporation under reduced pressure to remove the excess of the chlorine and the solvent. Recrystallization of the residue from n-hexane yields 5-cyclohexyl-6-chloroindan-1-carboxylic acid as colorless crystals.

The product is in well agreement with that obtained in the above examples in the melting point and the infrared absorption spectrum.

(10) To 2.4 parts of 5-cyclohexylindan-1-carboxylic acid is added under cooling an excess amount of diazomethane in ethyl ether, followed by keeping standing for 30 minutes. The resultant is subjected to evaporation under reduced pressure to remove diazomethane and ethyl ether, whereby methyl 5-cyclohexylindan-1-carboxylate is given as an oil boiling at 177 to 179° C./25 mm. The oil is left standing to give crystals melting at 42 to 45° C.

Elementary analysis.—Calculated (percent): C, 79.03; H, 8.58. Found (percent): C, 79.00; H, 8.86.

To a mixture of 0.8 part of methyl 5-cyclohexylindan-1-carboxylate obtained above, 0.5 part of ferric chloride and 30 parts by volume of dichloromethane is added dropwise with stirring at a temperature between −10 and 0° C. a solution of 0.24 part of chlorine in dichloromethane. The mixture is stirred at the same temperature, followed by the addition of ice-water and hydrochloric acid. After the mixture is shaken well, the lower layer is subjected to evaporation of the solvent. To the residue are added 30 parts by volume of ethanol and 10 parts by volume of a 33% aqueous solution of sodium hydroxide. The mixture is heated under reflux for 5 hours. The resultant, being once cooled, is subjected to evaporation to remove the solvent. The residue is supplied with water and acidified with hydrochloric acid. The separated substance is extracted with ethyl acetate. The ethyl acetate solution is dried over magnesium sulfate and subjected to evaporation to remove the solvent. The residue is washed well with petroleum ether, whereby 5-cyclohexyl-6-chloroindan-1-carboxylic acid is afforded. The product is in well agreement with the product obtained in the above examples in its melting point and infrared absorption spectrum.

EXAMPLE 2

Cyclization step

In a similar manner to that in Example 1, 2-(p-cyclohexylphenyl)glutaric acid is treated with acetic anhydride, whereby 2-(p-cyclohexylphenyl)glutaric anhydride is given in a yield of 92%. Recrystallization from a mixture of benzene and hexane (1:2 by volume) yields crystals melting at 103 to 104° C.

Elementary analysis.—Calculated (percent): C, 74.97; H, 7.40. Found (percent): C, 75.02; H, 7.43.

To polyphosphoric acid prepared from 80 parts of phosphorous pentoxide and 88 parts of phosphoric acid is added 19.8 parts of crude crystals of 2-(p-cyclohexylphenyl)glutaric anhydride as prepared above, followed by heating at 120 to 130° C. for 15 minutes. After cooling, ice-water is added to the resultant, whereby crystals are given. The crystals are washed with water and dried to give 4-oxo-6-cyclohexyl Tetralin-1-carboxylic acid in quantitative yield. Recrystallization from a mixture of ethyl ether and petroleum ether gives colorless crystals melting at 108.5 to 110° C.

Elementary analysis.—Calculated (percent): C, 74.97; H, 7.40. Found (percent): C, 74.84; H, 7.36.

Reduction step

To zinc amalgam prepared from 64.6 parts of zinc powder and 6.46 parts of mercuric chloride are added 65 parts by volume of water, 97 parts by volume of concentrated hydrochloric acid, 160 parts by volume of toluene, 6.5 parts by volume of acetic acid and 19.4 parts of 4-oxo-6-cyclohexyltetralin-1-carboxylic acid. The mixture is heated under reflux with vigorous stirring for 1 hour. After cooling, the resultant is extracted with ethyl ether. The ether layer is washed with water, dried over sodium sulfate and subjected to evaporation under reduced pressure to remove the solvent, whereby 11.5 parts of crude crystals of 6-cyclohexyl Tetralin-1-carboxylic acid are given. Recrystallization from 70% aqueous ethanol yields crystals melting at 131 to 132° C.

Elementary analysis.—Calculated (percent): C, 79.03; H, 8.58. Found (percent): C, 79.17; H, 8.64.

Halogenation step

To a solution of 5.0 parts of 6-cyclohexyl Tetralin-1-carboxylic acid in 150 parts of carbon tetrachloride is added 3.14 parts of ferric chloride. To the mixture is added dropwise with stirring 56.2 parts of carbon tetrachloride solution containing 2.69 weight per weight percent of chlorine. The whole mixture is stirred for 2.5 hours, followed by the addition of ice-water and hydrochloric acid to decompose the ferric chloride. The carbon tetrachloride layer is taken, washed with water, dried and subjected to evaporation under reduced pressure to remove the solvent. The resulting oily residue is treated with n-hexane to remove insolubles, whereby 7-chloro-6-cyclohexyl Tetralin-1-carboxylic acid is given as an oily substance.

Elementary analysis.—Calculated (percent): C, 69.73; H, 7.23; Cl, 12.11. Found (percent): C, 69.42; H, 7.32; Cl, 12.13.

The oil obtained as above is dissolved in ethyl ether and treated with diazomethane, whereby methyl 7-chloro-6-cyclohexyl Tetralin-1-carboxylate is given as an oily substance. The oil shows a significant infrared absorption maximum at 1735 cm.$^{-1}$ and nuclear magnetic resonance signals in deuterochloroform at 3.69 (due to methylproton), 6.95 (due to aromatic proton), and 7.13 (due to aromatic proton) parts per million.

EXAMPLE 3

Cyclization step

A mixture of 5.0 parts of p-isopropylphenylsuccinic acid and 25 parts by volume of acetic anhydride is heated under reflux for 1.5 hours. Excess of the acetic anhydride and acetic acid produced are evaporated under reduced pressure. Washing of the residue with petroleum ether yields 4.46 parts of crude crystals of p-isopropylphenylsuccinic anhydride. Recrystallization from petroleum benzin yields crystals melting at 83.5 to 85° C.

Elementary analysis.—Calculated (percent): C, 71.54; H, 6.47. Found (percent): C, 71.38; H, 6.41.

To 22 parts by volume of methylenechloride is added 2.93 parts of aluminum chloride, followed by stirring under ice-cooling. To the mixture is added a solution of 2.18 parts of p-isopropylphenylsuccinic anhydride in 22 parts by volume of methylenechloride, followed by stirring under ice-cooling for 1.5 hours and subsequently at room temperature for 2 hours. The resultant is poured into ice-water, followed by addition of hydrochloric acid. The methylenechloride layer is taken, washed with water, dried over anhydrous sodium sulfate and subjected to evaporation under reduced pressure to remove the solvent. The residue is washed with n-hexane to yield 1.80 parts of crude crystals of 3-oxo-5-isopropylindan-1-carboxylic acid. Recrystallization from a mixture of ethyl ether and petroleum ether yields crystals melting at 102 to 104.5° C.

Elementary analysis.—Calculated (percent): C, 71.54; H, 6.47. Found (percent): C, 71.56; H, 6.52.

Reduction step

To zinc amalgam prepared from 3.33 parts of zinc powder an 0.33 part of mercuric chloride, are added 3.3 parts by volume of water, 5 parts by volume of concentrated hydrochloric acid, 8.3 parts by volume of acetic acid and 1.0 part of 3-oxo-5-isopropylindan-1-carboxylic acid, and the whole mixture is heated under reflux for 1.5 hours. After cooling, the resultant is extracted with ethyl acetate. The ethyl acetate layer is washed wth water, dried over sodium sulfate, and subject to evaporation under reduced pressure to remove the solvent, whereby 0.90 part of 5-isopropylindan - 1 - carboxylic acid is given. Recrystallization from n-hexane yields crystals melting at 82 to 84° C.

Elementary analysis.—Calculated (percent): C, 76.44; H, 7.90. Found (percent): C, 76.50; H, 8.03.

Halogenation step

To a solution of 7.00 parts of 5-isopropylindan-1-carboxylic acid in 10 parts by volume of carbon tetrachloride is added 5.56 parts of ferric chloride. To the mixture is further added with stirring and under ice-cooling a solution of 2.92 parts as chlorine in carbon tetrachloride. After the addition, the stirring is further continued for 2 hours, followed by the addition of ice-water and hydrochloric acid to decompose ferric chloride. The carbon tetrachloride layer is taken, washed with water, dried, treated with charcoal and subjected to evaporation to remove the solvent. To the residue is added 50 parts by volume of petroleum ether and the mixture is allowed to stand, whereby 3.79 parts of 6 - chloro - 5 - isopropylindan - 1 - carboxylic acid is given. Recrystallization from n-hexane yields crystals melting at 124 to 125.5° C.

Elementary analysis.—Calculated (percent): C, 65.41; H, 6.33; Cl, 14.85. Found (percent): C, 65.46; H, 6.19; Cl, 15.22.

EXAMPLE 4

Cyclization step

A mixture of 5.0 parts of p-isobutylphenylsuccinic acid and 25 parts by volume of acetic anhydride is heated under reflux for 1.5 hours. The excess of acetic anhydride and by-produced acetic acid are removed from the resultant by evaporation under reduced pressure. Washing the residue with n-hexane yields 4.09 parts of crude crystals of p-isobutylphenylsuccinic anhydride. Recrystallization from a mixture of petroleum benzin and n-hexane yields crystals melting at 44.5 to 45.5° C.

Elementary analysis.—Calculated (percent): C, 72.39; H, 6.94. Found (percent): C, 72.40; H, 7.02.

To 22 parts by volume of methylenechloride is added 2.93 parts of aluminium chloride and the mixture is stirred under ice-cooling. To the mixture is added dropwise a solution of 2.32 parts of the crude crystals of p-isobutylphenylsuccinic anhydride as obtained above in 22 parts by volume of methylenechloride, followed by stirring under ice-cooling for 1.5 hours and subsequently at room temperature for 2 hours. The resultant is poured into ice-water, followed by the addition of hydrochloric acid. The methylenechloride layer is taken, washed with water, dried over sodium sulfate and subjected to evaporation under reduced pressure to remove the solvent. Washing the residue with n-hexane yields 1.94 parts of crude crystals of 3-oxo-5-isobutylindan-1-carboxylic acid. Recrystallization from a mixture of petroleum benzin and benzene yields crystals melting at 80.5 to 82° C.

Elementary analysis.—Calculated (percent): C, 72.39; H, 6.94. Found (percent): C, 72.28; H, 7.02.

Reduction step

To zinc amalgam prepared from 3.33 parts of zinc powder and 0.33 part of ferric chloride are added 3.3 parts by volume of water, 5 parts by volume of concentrated hydrochloric acid, 8 parts by volume of toluene, 0.3 part by volume of acetic acid and 1.0 part of 3-oxo-5-isobutylindan - 1 - carboxylic acid and the mixture is heated under reflux with vigorous stirring for 1 hour. After cooling, the mixture is extracted with ethyl acetate. The ethyl acetate layer is washed with water, dried over anhydrous sodium sulfate and subjected to evaporation under reduced pressure to remove the solvent, whereby 0.51 part of crude crystals of 5-isobutylindan - 1 - carboxylic acid are given. Recrystallization from n-hexane yields crystals melting at 73 to 74° C.

Elementary analysis.—Calculated (percent): C, 77.03; H, 8.31. Found (percent): C, 77.00; H, 8.38.

Halogenation step

To a mixture of 1.61 parts of 5-isobutylindan-1-carboxylic acid, 1.20 parts of ferric chloride and 60 parts by volume of carbon tetrachloride is added dropwise with stirring under ice-cooling a solution of 0.60 part of chlorine in carbon tetrachloride. One hour after the addition, ice-water and hydrochloric acid are added to the mixture, followed by extraction with chloroform. The chloroform layer is washed with water, dried over sodium sulfate and subjected to evaporation under reduced pressure to remove the solvent. Treating the residue with petroleum benzin yields 0.76 part of crude crystals of 6-chloro-5-isobutylindan-1-carboxylic acid. Recrystallization from petroleum benzin yields crystals melting at 116 to 117° C.

Elementary analysis.—Calculated (percent): C, 66.52; H, 6.78; Cl, 14.03. Found (percent): C, 66.46; H, 6.79; Cl, 14.19.

EXAMPLE 5

Cyclization step

A mixture of 44.0 parts of m-chloro-p-isobutylphenylsuccinic acid and 220 parts by volume of acetic anhydride is heated under reflux for 1.5 hours, followed by removal of acetic acid produced and the excess of the acetic anhydride by evaporation under reduced pressure. To the residue is added 250 parts by volume of a mixture of ethyl ether an n-hexane (1:10 by volume). The mixture is left standing and the precipitated crystals are collected and recrystallized from a mixture of 20 parts by volume of ethyl ether and 100 parts by volume of n-hexane, whereby m-chloro-p-isobutylphenylsuccinic anhydride is given as crystals melting at 61 to 62° C. Yield: 13.5 parts.

Elementary analysis.—Calculated (percent): C, 63.03; H, 5.67; Cl, 13.29. Found (percent): C, 63.21; H, 5.70; Cl, 13.25.

To 125 parts by volume of methylene chloride is added 13.8 parts of pulverized aluminum chloride, followed by cooling with ice-water. To the mixture is added dropwise with stirring a solution of 12.5 parts of m-chloro-p-isobutylphenylsuccinic anhydride in 150 parts by volume of methylene chloride, followed by stirring under cooling with ice-water for 3 hours and then at room temperature for 2 hours. Ice-water and concentrated hydrochloric acid are added to the resultant to decompose aluminum chloride. Chloroform is added to the resultant and the mixture is shaken. The separated organic layer is washed with water, dried and subjected to evaporation under reduced pressure to remove the solvent. The resulting powder is recrystallized from 200 parts by volume of a mixture of benzene and cyclohexane (1:1 by volume), whereby 3-oxo-6-chloro-5-isobutylindan-1-carboxylic acid is given as crystals melting at 148.5 to 149.5° C. Yield: 5.94 parts.

Elementary analysis.—Calculated (percent): C, 63.03; H, 5.67; Cl, 13.29. Found (percent): C, 63.13; H, 5.65; Cl, 13.28.

Reduction step

A mixture of 3.87 parts of 3-oxo-6-chloro-5-isobutylindan-1-carboxylic acid, 32.3 parts by volume of toluene, 1.3 parts by volume of acetic acid, 19.4 parts by volume of concentrated hydrochloric acid, 12.9 parts by volume of water and zinc amalgam prepared from 12.9 parts of zinc powder and 1.29 parts of mercuric chloride is heated under reflux with vigorous stirring for 1 hour. After cooling, the resultant is extracted with ethyl acetate. The ethyl acetate layer is washed with water, dried and subjected to evaporation under reduced pressure to remove the solvent. The resulting powder is recrystallized from petroleum ether, whereby 6-chloro-5-isobutylindan-1-carboxylic acid is given as crystals melting at 116 to 117° C. Yield: 1.90 parts.

Elementary analysis.—Calculated (percent): C, 66.52; H, 6.78; Cl, 14.03. Found (percent): C, 66.46; H, 6.79; Cl, 14.19.

EXAMPLE 6

Cyclization step

To a mixture of 1.84 parts of finely pulverized anhydrous aluminum chloride and 15 parts by volume of methylenechloride is added dropwise with stirring under ice-cooling a solution of 1.70 parts of 2-methyl-2-(p-cyclohexylphenyl)succinic anhydride in 10 parts by volume of methylenechloride. The whole mixture is stirred under ice-cooling for 2 hours and then at room temperature for 2 hours, followed by being left standing overnight. To the resultant are added under ice-cooling flakes of ice, concentrated hydrochloric acid and chloroform, followed by shaking well. The separated lower layer is dried and subjected to evaporation to remove the solvent. To the residue is added n-hexane and the mixture is allowed to stand, whereby 1 - methyl-3-oxo-5-cyclohexylindan-1-carboxylic acid is given as colorless crystals melting at 119 to 127° C.

Elementary analysis as $C_{17}H_{20}O_3$.—Calculated (percent): C, 74.97; H, 7.40. Found (percent): C, 75.23; H, 7.43.

Reduction step

A mixture of zinc amalgam which is prepared from 6 parts of zinc powder, 0.6 part of mercuric chloride and hydrochloric acid, 2.7 parts of 1-methyl-3-oxo-5-cyclohexylindan-1-carboxylic acid prepared above, 40 parts by volume of 20% hydrochloric acid and 10 parts by volume of toluene is heated under reflux with vigorous stirring for 8 hours. After cooling, water and ethyl acetate are added to the resultant, followed by shaking well. The separated organic layer is washed with water, dried and subjected to evaporation under reduced pressure to remove the solvent. The residue is washed with petroleum ether and recrystalized from n-hexane, whereby 1-methyl-5-cyclohexylindan-1-carboxylic acid is yielded as colorless crystals melting at 165 to 166° C.

Elementary analysis as $C_{17}H_{22}O_2$.—Calculated (percent): C, 79.03; H, 8.58. Found (percent): C, 79.11; H, 8.48.

Halogenation step

To a mixture of 1.3 parts of 1-methyl-5-cyclohexylindan-1-carboxylic acid prepared above, 0.8 part of ferric chloride and 40 parts by volume of methylene chloride is added dropwise with stirring under ice-cooling a solution of 0.39 part of chlorine in methylene chloride. The whole mixture is stirred under ice-cooling for 1 hour, followed by the addition of diluted hydrochloric acid and shaking well. The separated lower layer is dried and subjected to evaporation to remove the solvent. The residue is washed with petroleum ether and recrystallized from n-hexane, whereby 1-methyl-5-cyclohexyl-6-chloroindan-1-carboxylic acid is given as colorless crystals melting at 186 to 187° C.

Elementary analysis as $C_{17}H_{21}OCl$.—Calculated (percent): C, 69.73; H, 7.30; Cl, 12.11. Found (percent): C, 69.71; H, 7.14; Cl, 12.35.

EXAMPLE 7

Cyclization step

A mixture of 16 parts of p-cyclohexyl-m-chlorophenylsuccinic acid and 80 parts by volume of acetic anhydride is refluxed for 1 hour, followed by evaporation of the solvent under reduced pressure. Addition of n-hexane and a small amount of ethyl ether to the resultant yields 13.6 parts of crude crystals of p-cyclohexyl-m-chlorophenylsuccinic anhydride. Recrystallization from ligroin yields crystals melting at 121–124° C.

Elementary analysis.—Calculated (percent): C, 65.64; H, 5.85; Cl, 12.11. Found (percent): C, 65.92; H, 5.85; Cl, 12.04.

A solution of 9.1 parts of the crude crystals of p-cyclohexyl-m-chlorophenylsuccinic anhydride prepared above in 50 parts by volume of methylene chloride is added dropwise to a mixture prepared by mixing 9.2 parts of aluminium chloride and 70 parts by volume of methylene chloride under ice-cooling. The whole mixture is stirred for 1 hour under ice-cooling and then for about 5-hours at room temperature. After being left standing overnight, the resultant is poured into ice-water, followed by addition of hydrochloric acid and chloroform and shaking well. The organic layer is taken, dried over anhydrous sodium sulfate, decolorized with charcoal and subjected to evaporation of the solvent under reduced pressure. Addition of 60 parts by volume each of n-hexane and ethyl ether to the residue yields 6.6 parts of powdery mixture of 3-oxo-5-cyclohexyl-6-chloroindan - 1-carboxylic acid and 3-oxo-5-cyclohexyl-4-chloroindan-1-carboxylic acid. Recrystallization from 70 parts by volume of benzene yields specifically 3-oxo-5-cyclohexyl-6-chloroindan-1-carboxylic acid as colorless crystals melting at 181–190° C. Yield: 3.2 parts.

Elementary analysis.—Calculated (percent): C, 65.64; H, 5.85; Cl, 12.11. Found (percent): C, 65.64; H, 5.75; Cl, 12.13.

Reduction step

In a similar manner to that in Example 1, Clemensen reduction is applied on 2.5 parts of 3-oxo-5-cyclohexyl-6-chloroindan-1-carboxylic acid prepared above to yield 1.3 parts of 5-cyclohexyl-6-chloroindan-1-carboxylic acid as colorless crystals melting at 149–151° C.

Elementary analysis.—Calculated (percent): C, 68.94; H, 6.87; Cl, 12.72. Found (percent): C, 69.00; H, 6.84; Cl, 12.91.

EXAMPLE 8

Alkylation

In 10 parts by volume of dimethylsulfoxide are dissolved 1.83 parts of methyl 5-cyclohexylindan-1-carboxylate and 1.52 parts of methyl iodide. To the solution is added gradually with stirring 0.170 part of sodium hydried at room temperature under nitrogen atmosphere. The mixture is further stirred for 1 hour and the resultant is poured into ice-water, followed by extraction with ethyl ether. The ether layer is washed with water, dried over sodium sulfate and subjected to evaporation under reduced pressure to remove ethyl ether, whereby 1.95 parts of methyl 5-cyclohexyl-1-methylindan-1-carboxylate is yielded.

A mixture of 1.95 parts of methyl 5-cyclohexyl-1-methylindan-1-carboxylate, 2.0 parts of potassium hydroxide, 20 parts by volume of ethanol and 5 parts by volume of water is heated under reflux for 5 hours. After cooling, the resultant is poured into ice-water and washed with ether. The aqueous layer is neutralized with diluted hydrochloric acid, whereby crystals are separated out. The crystals are washed well with water to give 1.48 parts of 5-cyclohexyl-1-methylindan-1-carboxylic acid. Recrystallization from n-hexane yields crystals melting at 165 to 166° C.

Elementary analysis as $C_{17}H_{22}O_2$.—Calculated (percent): C, 79.03; H, 8.58. Found (percent): C, 78.97; H, 8.50.

This compound is subjected to the same halogenation process as in Example 6 to give 6-chloro-5-cyclohexyl-1-methylindan-1-carboxylic acid.

EXAMPLE 9

Alkylation

To a solution of 1.59 parts of methyl 6-chloro-5-cyclohexylindan-1-carboxylate in 10 parts by volume of dimethyl sulfoxide is added gradually with stirring at room temperature 0.160 part of sodium hydride under nitrogen atmosphere, followed by further addition of 1.0 part of methyl iodide. The mixture is stirred for further 1 hour and the resultant is poured into ice-water, followed by extraction with ethyl ether. The ether layer is washed with water, dried over sodium sulfate and subjected to evaporation under reduced pressure to remove the solvent, whereby 1.6 parts of methyl 6-chloro-5-cyclohexyl-1-methylindan-1-carboxylate is given.

A mixture of 1.6 parts of methyl 6-chloro-5-cyclohexyl-1-methylindan-1-carboxylate, 0.5 part of sodium hydroxide, 10 parts by volume of ethanol and 10 parts by volume of water is heated under reflux for 3 hours. After cooling, the resultant is poured into ice-water, followed by washing with ethyl ether. The aqueous layer is neutralized with diluted hydrochloric acid, whereby crystals are separated out. The crystals are washed well with water and dried to give 1.40 parts of 6-chloro-5-cyclohexyl-1-methylindan-1-carboxylic acid. Recrystallization from a mixture of benzene and n-hexane yields crystals melting at 186 to 187° C.

Elementary analysis as $C_{17}H_{21}OCl$.—Calculated (percent): C, 69.73; H, 7.30; Cl, 12.11. Found (percent): C, 69.69; H, 7.16; Cl, 12.76.

EXAMPLE 10

Esterification of —COOH group

To a solution of 6.5 parts of 6-chloro-5-cyclohexylindan-1-carboxylic acid in 30 parts by volume of ethyl acetate is added dropwise ethyl ether solution of diazomethane until foaming has ceased. The resultant is dried over sodium sulfate and subjected to evaporation under reduced pressure to remove the solvent, whereby methyl ester of 6-chloro-5-cyclohexylindan-1-carboxylic acid is quantitatively given as an oily substance boiling at 170 to 171° C./1.0 mm. Hg.

Elementary analysis.—Calculated (percent): C, 69.73; H, 7.23; Cl, 12.11. Found (percent): C, 69.79; H, 6.99; Cl, 12.61.

EXAMPLE 11

Amidation of —COCH$_3$ group

Into a solution of 1.1 parts of 6-chloro-5-cyclohexylindan-1-carboxylic acid methyl ester in 50 parts by volume of methanol is introduced an excess amount of ammonia gas. The mixture is heated in a sealed tube at a temperature between 90 and 95° C. for 3 hours, followed by evaporation of the solvent, whereby 6-chloro-5-cyclohexylindan-1-carboxyamide is given. Recrystallization from methanol yields 0.8 part of the crystal melting at 184 to 185° C.

Elementary analysis.—Calculated (percent): C, 69.18; H, 7.26; N, 5.04; Cl, 12.76. Found (percent): C, 68.95; H, 7.19; N, 5.19; Cl, 12.54.

EXAMPLE 12

Preparation of sodium salt

To a solution of 1.394 parts of 6-chloro-5-cyclohexylindan-1-carboxylic acid in 30 parts by volume of dry ethanol is added dropwise an alcoholate solution prepared from 0.115 part of metallic sodium and ethanol. The mixture is shaken well and allowed to stand for a while, followed by evaporation of the ethanol under reduced pressure. To the residue is added 50 parts by volume of acetone and the mixture is allowed to stand overnight, whereby crystals are separated out. Washing the crystals with acetone yields 1.60 parts of crude crystals of sodium salt of 6-chloro-5-cyclohexylindan-1-carboxylic acid. Recrystallization from hydrous acetone yields crystals softening at 83 to 95° C., while not melting completely at a higher temperature than that.

Elementary analysis as $C_{16}H_{18}O_2ClNa \cdot \frac{1}{2}H_2O$.—Calculated (percent): C, 62.04; H, 6.18; Cl, 11.44; N, 7.42. Found (percent): C, 62.40; H, 6.45; Cl, 11.40; N, 7.22.

EXAMPLE 13

Resolution of a racemic mixture (1) Into 90 parts by volume of acetone are dissolved 8.4 parts of 6-chloro-5-cyclohexylindan-1-carboxylic acid and 4.8 parts of quinine, followed by cooling, whereby crystals are separated. The whole resultant is subjected to filtration to separate the crystals from the mother liquor. The recovered crystals are recrystallized from acetonitrile, dissolved into chloroform and treated with diluted hydrochloric acid to remove quinine. The solution is washed with water, dried over sodium sulfate and subjected to evaporation under reduced pressure to remove the solvent. Recrystallization of the residue from 25 parts by volume of n-hexane yields 1.54 part of crystals of (−)-6-chloro-5-cyclohexylindan - 1 - carboxylic acid. Melting point: 130 to 135° C. $[\alpha]_D^{25} = -28.3°$ (C.=1, methanol).

Elementary analysis.—Calculated (percent): C, 68.94; H, 6.87; Cl, 12.72. Found (percent): C, 68.73; H, 6.89; Cl, 12.84.

The mother liquor obtained above is subjected to evaporation of the solvent under reduced pressure. The residue is dissolved in chloroform. The solution is washed with diluted hydrochloric acid and then with water, dried over sodium sulfate and subjected to evaporation of the solvent under reduced pressure. Recrystallization of the residue from n-hexane yields firstly 3.68 parts of crystals of racemic form of 6-chloro-5-cyclohexylindan-1-carboxylic acid. The crystals are recovered by filtration and the filtrate is subjected to evaporation to remove the solvent and the residue is recrystallized from n-hexane to precipitate 0.52 part of a racemic mixture. The mixture is recovered by filtration. The filtrate is subjected to evaporation and the residue is recrystallized from n-hexane, whereby 1.28 parts of crystals of (+)-6-chloro-5-cyclohexylindan-1-carboxylic acid is given. Melting point: 130 to 135° C.

$[\alpha]_D^{25} = +28.1°$ (C.=1, methanol).

Elementary analysis.—Calculated (percent): C, 68.94; H, 6.87; Cl, 12.72. Found (percent): C, 68.87; H, 6.97; Cl, 12.93.

(2) Into 60 parts by volume of acetone are dissolved 2.79 parts of 6-chloro-5-cyclohexylindan-1-carboxylic acid and 3.24 parts of quinine, followed by cooling. Repeating fractional recrystallization of the separated crystals from acetonitrile yields separately two kinds of crystals, one melting at 124 to 129° C. and the other melting at 175 to 179° C. Treatment of the former crystals with hydrochloric acid yield (—)-6-chloro-5-cyclohexylindan-1-carboxylic acid, while the treatment of the latter one with hydrochloric acid yields (+)-6-chloro-5-cyclohexylindan-1-carboxylic acid. Thus obtained compounds are in well agreement with the compound obtained in (1) in the infrared, ultraviolet and nuclear magnetic resonance spectra, specific rotation, specific rotating and distributing curve and elementary analysis.

What we claim is:
1. A compound of the formula

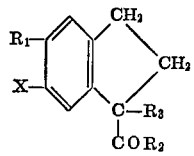

wherein $R_1$ is alkyl having up to 6 carbons or cycloalkyl having from 3 to 6 carbon atoms, $R_2$ is amino, $R_3$ is hydrogen or alkyl having up to 4 carbon atoms, X is halogen.

2. 6-chloro-5-cyclohexyl-1-methylindan - 1-carboxylic acid.

3. A compound according to claim 1, namely, 6-chloro-5-cyclohexylindan-1-carboxyamide.

References Cited

UNITED STATES PATENTS

| | | | |
|---|---|---|---|
| 3,565,943 | 2/1971 | Juby et al. | 260—469 |
| 3,565,904 | 2/1971 | Juby et al. | 260—469 |
| 3,505,404 | 4/1970 | Peterson et al. | 260—558 |
| 2,948,724 | 8/1960 | Sahyun | 260—558 |

OTHER REFERENCES

McColl et al.: Arch. Int. Pharmacodyn., pp. 181–189 (1963), vol. CXLI.

HARRY I. MOATZ, Primary Examiner

U.S. Cl. X.R.

260—448 B, 465 D, 465 G, 465 R, 465 H, 469, 475 SC, 518 R, 518 A, 544 M, 546, 558 R, 592, 599; 424—308, 317, 324